Dec. 11, 1962

H. GALMAN 3,068,411

WATTMETER CIRCUIT

Filed April 6, 1959

HERBERT GALMAN
INVENTOR.

BY Robert H. Fraser

ATTORNEY

Dec. 11, 1962     H. GALMAN     3,068,411
WATTMETER CIRCUIT

Filed April 6, 1959                                                                   2 Sheets-Sheet 2

HERBERT GALMAN
INVENTOR.

BY Robert H. Fraser
ATTORNEY

United States Patent Office 3,068,411
Patented Dec. 11, 1962

3,068,411
WATTMETER CIRCUIT
Herbert Galman, 1612 N. Altadena Drive,
Pasadena, Calif.
Filed Apr. 6, 1959, Ser. No. 804,218
7 Claims. (Cl. 324—142)

This invention relates to meters for determining or indicating load or power, and more particularly to meters for measuring phase angle, wattage, or load values.

The present invention is directed to wattmeters, load meters and other similar instruments. While a wide variety of such devices is presently available, it has nevertheless been extremely difficult to provide a simple and economical meter including the combination of features which are generally recognized as desirable. The electrical portion of a meter circuit, for example, should be as simple and economical as is feasible, but at the same time the indicating device should not be delicate or complex. Thus, it is preferable to employ a conventional milliammeter movement because of its ruggedness and availability. Heretofore, such a combination of a simple circuit and a readily obtainable and physically robust indicator movement has not been achieved.

Among the other operating features which are recognized as desirable in a load meter or wattmeter are accurate linear characteristics despite temperature and other environmental changes and despite variations of frequency. Furthermore, if possible, the device should operate with low power consumption, because of the necessity of correcting for power consumed in the device when extremely low powers are to be measured. Devices heretofore available have not satisfied all these requirements concurrently.

It is therefore an object of the present invention to provide an improved meter circuit which operates accurately under widely varying conditions but which is nevertheless simple in construction.

Another object of this invention is to provide an extremely accurate meter circuit which has low power consumption but which is at the same time little affected by temperature.

Yet another object of this invention is to provide an improved wattmeter capable of utilizing a simple milliammeter movement in conjunction with an accurate but economical circuit.

A further object of this invention is to provide an extremely simple load meter circuit capable of providing a load indication based on a current output.

Yet another object of this invention is to provide an improved phase sensitive system responsive to input currents and voltages for purposes of control or indication.

These and other objects of the present invention are achieved by a combination which utilizes a current transformer responsive to the input current and a symmetrically coupled detector circuit. Input voltages are applied after suitable transformation to a center tap of the secondary of the current transformer and to a mid-point of the phase detector circuit. The phase detector may include two or more voltage-sensitive impedances, such as diode elements. Current outputs taken across the phase detector are in proportion to the product of the input current and the cosine of the phase angle between the input current and the input voltage. When a specified voltage is employed, this arrangement can be employed with a conventional milliammeter, or with various control circuitry to operate as a load meter.

When it is desired to provide a wattmeter function in accordance with the present invention, a voltage transformer responsive to the input voltage may have its secondary coupled to the center tap of the current transformer and to the mid-point of the phase detector. The combination may also include a voltage multiplier used in an integrated manner. In one form of the invention, the voltage multiplier may consist of a series of elements having variable resistivity coupled directly across the secondary of the current transformer. These elements, such as a number of series-connected tungsten wire incandescent lamps may also have a mid-point coupled to a terminal of the voltage transformer. With this arrangement, the input voltage can be made to vary the resistivity of the lamps, so that in effect current from the output of the current transformer can be multiplied by voltage.

In another form of the invention, voltage multiplication to achieve a desired current output is effectively provided by the use of variable-resistance circuits directly coupling the current transformer and the voltage transformer. Again, the resistances are operated with relationships such that they are proportional to the input voltage. Both arrangements make possible the use of an associated milliammeter movement while operating with low power consumption and maintaining their accuracy despite temperature and other environmental changes.

The novel features of this invention, as well as the invention itself, may be better understood by reference to the following description, taken in conjunction with the accompanying drawings, in which like reference numerals refer to like parts, and in which.

The manner in which current and voltage relationships combine to represent a power dissipation is generally well known. For reference purposes it may be said that when a voltage E and a current I are provided from an alternating power source, the power in watts delivered by the source is determined by the relationships $EI \cos \theta$, where $\theta$ is the relative phase angle between the voltage and the current. A wattmeter thus measures $EI \cos \theta$. A load meter is also useful in many applications and provides an output of $E_0 I \cos \theta$, where $E_0$ is a substantially constant and specified or nominal input voltage.

Figure 1:
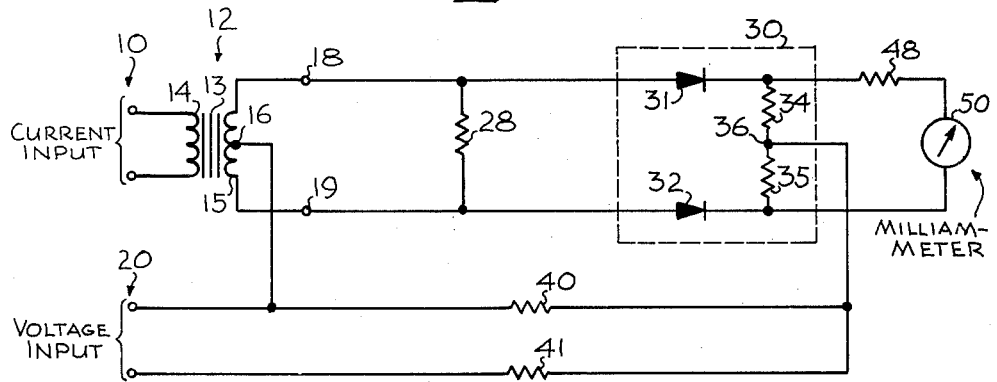
FIG. 1 is a schematic circuit representation of a load meter arranged in accordance with the present invention.

A load meter in accordance with the invention, referring now to FIG. 1, may derive a signal representing current flow by passing the current between the input terminals 10 and a signal representing voltage by applying the voltage across the terminals 20. The current and voltage signals are employed in the arrangement of the invention to derive a signal representing $E_0 I \cos \theta$. Accordingly, current input signals are passed by a current transformer 12 having a core 13 from the current input terminals 10 which appear across the primary 14 of the transformer 12. The secondary 15 of the current transformer 12 has a center-tapped terminal 16 and output terminals 18 and 19.

A load resistor 28 is coupled directly across the output terminals 18 and 19 of the current transformer 12. A phase detector circuit 30 is in turn coupled in shunt across the load resistor 28. The phase detector circuit 30 is symmetrically arranged with respect to the output terminals 18 and 19 of the current transformer 12. The term "phase detector circuit" is used here in conformity with general practice to designate a circuit which provides an output corresponding to the phase relationship of a first signal and a different second signal. A number of such phase detector circuits are known, but the present phase detector circuit 30 has particular advantages when utilized in the combination shown. In this combination, a pair of like-poled diodes 31 and 32 are coupled separately to opposite ends of a voltage divider pair of resistors 34 and 35. The point of symmetry for the phase detector circuit 30 is the mid-point 36 between the voltage divider resistors 34 and 35. Outputs from the phase detector circuit 30 are provided through an associated series-connected resistor 48 and a D.C. milliammeter 50. The D.C. milliammeter 50 may utilize any of the widely employed and mechanically rugged movements generally available.

In order for the elements within the phase detector circuit 30 to operate symmetrically, the paired elements consisting of the diodes 31 and 32 and the voltage divider resistors 34 and 35 are selected to have like the characteristics. Note that the diodes 31 and 32 constitute voltage-sensitive impedances. When the voltage on the diodes 31 and 32 biases them in their direction of reverse conduction, the diodes 31 and 32 effectively present an extremely high impedance to an applied current. Conversely, when biased in the direction of forward conduction, the diodes 31 and 32 present very little impedance.

Phase angle is accurately determined in the arrangement of the invention by the relationship between the voltage and current input signals. One of the voltage input terminals 20 is coupled to the center tap 16 of the current transformer 12, and also is coupled through a voltage divider resistor 40 to the mid-point 36 of the phase detector circuit 30. The remaining one of the voltage input terminals 20 is coupled through a different voltage divider resistor 41 to the mid-point 36 of the phase detector circuit 30. With the resistors 40 and 41 employed as shown between the terminals 20 and the mid-point 36 of the phase detector circuit 30, there is a fixed relationship between the input voltage and the potential between the center tap 16 of the current transformer 12 and the mid-point 36 of the phase detector circuit 30.

In the operation of the arrangement of FIG. 1, $E_0 I \cos \theta$ outputs are provided from a voltage input signal E across the voltage terminals 20, and a current input signal I across the current input terminals 10. A current through the primary 14 of the current transformer 12 is converted to a different current value at the secondary 15, as determined by the relationship of the turns in each winding. The load resistor 28 provides an attenuation adjustment which establishes proper levels for the phase detector circuit 30. Current variations from the current transformer 12 constitute one signal input to the phase detector circuit 30. The second input consists of the voltage differences applied from the voltage input 20 between the center tap 16 and the mid-point 36 of the phase detector circuit 30. The input voltage E is an alternating signal of a constant nominal value, $E_0$, whose phase relationship to the current input determines the portion and the amount of the instantaneous input current which is utilized in the phase detector circuit 30 to provide an output. When the input voltage is in a positive half-cycle, the potential difference between the center tap 16 and the mid-point 36 provides a potential of positive polarity across the like-poled diodes 31 and 32.

Accordingly, the diodes 31 and 32 present little impedance to current flow at this time, and the signal across the terminals 18 and 19 is conducted to the output across resistors 34 and 35. If the input voltage and input current are exactly in phase, there is conduction for a full half-cycle (during the positive half portion) of one polarity of the current signal. There is no conduction during the remaining half-cycle of the full cycle. The D.C. milliammeter 50 thus receives a half wave signal of positive polarity. If the input current and voltage are directly out-of-phase, there is also conduction through diodes 31 and 32 during the half-cycle in which the diodes 31 and 32 are biased to provide low impedance.

The conducted current signal is opposite to that which occurs for in-phase signals. The currents applied to the D.C. milliammeter 50 are of opposite directions and accordingly, provide opposite polarity indications. Thus, with inputs of exactly opposing phase, a half wave signal of negative polarity is provided to the milliammeter 50. The milliammeter 50 thus provides a full amplitude indication of appropriate polarity.

If the phase angle between the input current and voltage is between zero and 180°, the signals provided at the milliammeter 50 will vary between positive and negative polarity, or vice versa, during the conducting half-cycle. If the signals are 90° out-of-phase, for example, the positive and negative portions will be alike in duration and peak. For other out-of-phase relationships, the signals will be unequal. This constitutes the superimposition of one sine wave on another, to provide a difference wave during selected half-cycles. The difference wave is dependent upon the relative phase angles of the input current and input voltage, so that the D.C. output current applied to the D.C. milliammeter 50 is proportional to $I \cos \theta$. By making the constant of proportionality equal to $E_0$, the system operates to provide the desired measurement, $E_0 I \cos \theta$, since $E_0$ is the nominal or specified value of E.

The operation may also be considered with respect to the current-voltage relationship at the milliammeter 50. When no input current is provided, no corresponding differential voltage is applied to the milliammeter 50 during the conducting half-cycle. When there is an input current, the resulting differential voltage across the load resistor 28 is directly applied to the milliammeter 50 circuit when the phase detector 30 conducts. If the differential voltage is significantly less than the input voltage from the input terminals 20, the output at the milliammeter is dependent only on the input current and not on the input voltage.

Some of the advantages of this system as a load meter will now be apparent. First, the output signal which is provided is a current variation, so that a rugged D.C. milliammeter movement may be employed instead of more complex and fragile indicators of other kinds. The use of a load meter of this type permits the making of a wattage reading at a specified voltage, and results in greater accuracy, because with the voltage remaining constant, only current changes affect the accuracy of the system. Note also that the elements which are used are not frequency sensitive.

Figure 2:
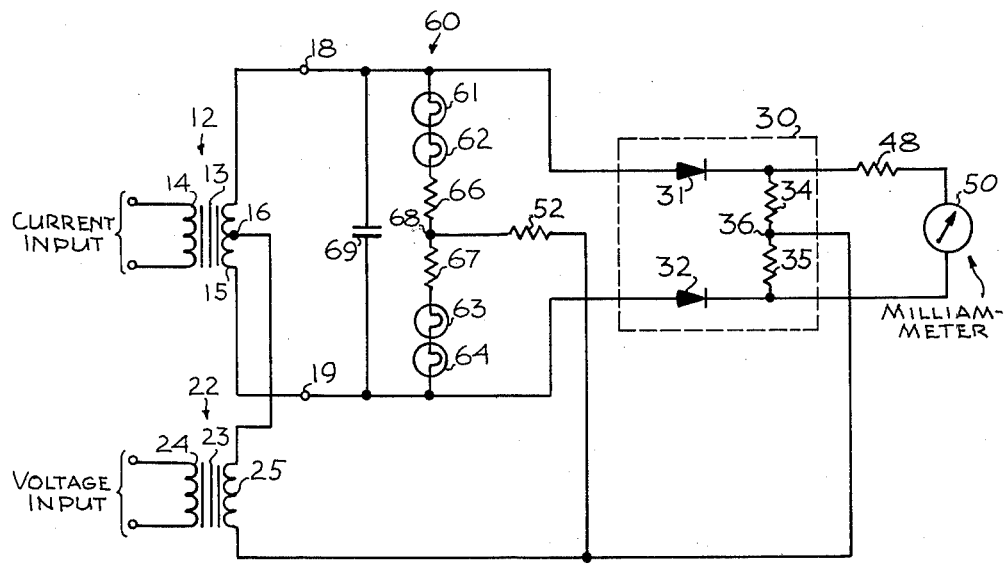
FIG. 2 is a schematic circuit representation of one form of a wattmeter circuit in accordance with the present invention and employing half-wave rectification.

Another arrangement which may be employed in accordance with the invention, for the purpose of providing a wattmeter, is shown in FIG. 2. Referring to that figure, a number of the elements of the combination have relationships and functions similar to like elements in the arrangement of FIG. 1. Accordingly, corresponding number designations have been employed and only a brief description need be provided of these elements. For example, current inputs are provided at an input terminal 10 and thence to a current transformer 12 having a center-tapped secondary 15. A phase detector circuit 30 is coupled to an associated D.C. milliammeter 50.

The wattmeter circuit, however, is intended to operate with a varying voltage E, so that a voltage transformer 22 is employed in place of the fixed resistors of FIG. 1. The primary 24 of the voltage transformer 22 is coupled across the voltage input terminals. The core 23 of the voltage transformer 22 couples the primary 24 to the secondary 25, which has, in accordance with well known techniques, a turns ratio to the primary which enables the provision of a suitable voltage difference for the associated circuitry. One terminal of the secondary 25 is coupled to the center tap 16 of the secondary 15 of the current transformer 12. The remaining terminal of the secondary 25 is coupled to the mid-point 36 of the phase detector 30, and also through a fixed resistor 52 to the mid-point of a variable resistance load circuit 60.

The variable resistance load circuit 60 principally includes a series chain of like incandescent lamps 61, 62, 63 and 64 symmetrically disposed in pairs on opposite sides of a mid-point 68 of the circuit 60. The incandescent lamps 61–64 preferably are of the type which employ tungsten wire filaments, and have the characteristic that over a range of their operation, their resistance varies linearly with their temperature. A pair of fixed resistors 66 and 67 couple the pairs of the lamps 61, 62 and 63, 64 symmetrically to the mid-point 68 of the variable resistance circuit 60. A shunt capacitor 69 may be coupled across the outputs 18 and 19 of the current transformer 12 and the resistors in the variable resistance circuitry. Because the variable resistance circuit 60 is intended to operate symmetrically with respect to the mid-point 68, the values of the individual incandescent lamps 61–64 are chosen so that the lamps have like characteristics. Four lamps 61–64 are shown because well known commercial types provide proper operation when so arranged. It will be recognized that two, or more than four lamps, may also be used. The associated resistors 66 and 67 are selected to operate the lamps at desired levels in accordance with considerations given more fully below.

The variable resistance circuit 60 operates in conjunction with the voltage transformer 22 and the associated circuitry to provide a voltage multiplier for the combination. As in the arrangement of FIG. 1, input currents applied to the current input terminal 10 are sensed in phase by the phase detector circuit 30 under control of the applied voltages, the variable voltage E here being applied between the mid-point 36 of the phase detector 30 and the center tap 16 of the current transformer 12. Thus, the term I cos θ is provided at the milliammeter 50 in the same manner as in the arrangement of FIG. 1. The multiplication of this term by the voltage E, however, is achieved uniquely by the use of the variable resistance circuit 60 in the manner indicated.

The input voltage E is applied through the voltage transformer 22 and in series with the separate pairs 61, 62 and 63, 64 of the incandescent lamps. With the values of the associated resistors 66 and 67 properly selected, the lamps 61–64 are operated in a relatively high temperature portion of their operating range. Because the tungsten wire of the lamps 61–64 has a high temperature coefficient, the resistance of the lamps 61–64 then varies in proportion to their temperature, which is dependent upon the current through them. The heating current is actually dependent upon the voltage from the voltage input. This is due to the fact that the voltage is applied symmetrically and directly across the pairs of lamps 61–64, so that the level of the voltage is the only material factor in heating the lamps 61–64. The heating of the lamps 61–64 is dependent upon the R.M.S. amplitude of the voltage, not upon instantaneous values of voltage or current. Thus, the secondary 15 of the current transformer operates into a load circuit which is in effect a variable resistance.

Actually, the lamps 61–64 may be selected to have the desired characteristics by testing them with only voltage variations being effective. The lamps may be arranged in a bridge circuit which is balanced so that only changes in resistivity, not changes in input voltage, provide an output. Then the desired linear portion of the operating characteristics of the lamps may be found by determining resistivity at various input voltages. With like lamps, the individual characteristics also correspond. The current at the milliammeter 50 therefore varies in correspondence to the voltage. Accordingly, there is an additional multiplication of the I cos θ term by the factor E, which provides the desired relationship necessary for power indication with a current meter.

Arrangements constructed in accordance with this invention have provided the desired accuracy over a wide range of inputs. The variable resistance circuit 60, for example, has been found accurate to 1% for a plus or minus 25% voltage change. A number of significant advantages are further found in arrangements thus constructed. Changes in ambient temperature have little effect, because the lamps are operated at an elevated temperature. The amount of power consumed in providing the desired indication is another important factor. With circuits thus constructed, five milliwatts and less can be used to provide full scale deflection. Such circuits thus avoid the need for extensive corrective arrangements to compensate for the power consumed by the measuring device itself. Again, an accurate but physically strong milliammeter movement can be used. It will be recognized by those skilled in the art that the current output provided may as well be utilized for other control purposes as with an indicator or meter. Thus, these signals may operate switching circuits, indicating devices of other kinds, or servo mechanisms.

Figure 3:
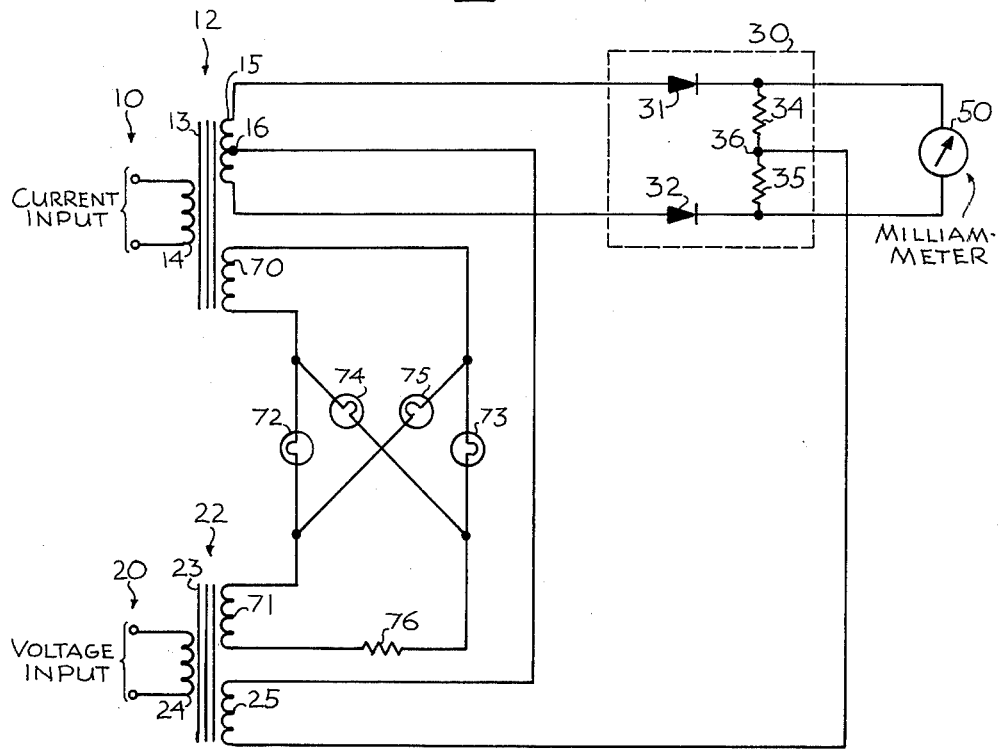
FIG. 3 is a schematic diagram of a different form of wattmeter in accordance with the present invention.

For different operating conditions, the arrangement of FIG. 3 may also be employed. As in the arrangement of FIG. 2, this combination may use a current transformer 12 and a voltage transformer 22 coupled to a phase detector circuit 30 and an associated milliammeter 50. Like numbers have again been utilized to designate elements having similar functions and relationships to the corresponding elements of FIG. 2. In the arrangement of FIG. 3, however, the current requirements imposed on the current transformer 12 are minimized by the use of a voltage multiplier circuit directly coupling the cores 13 and 23 of the current transformer 12 and the voltage transformer 22, respectively. An additional control winding 70 is coupled to the core 13 of the current transformer 12. An additional control winding 71 is also coupled to the core 23 of the voltage transformer 22. These control windings 70 and 71 are intercoupled through a series pair of incandescent lamps 72 and 73 and a cross-coupled pair of lamps 74 and 75. The bridge thus formed operates to provide a balanced resistive coupling between the transformers 12 and 22. When the lamps 72–75 are arranged as shown and the coupled resistor 76 is properly selected, the bridge is balanced. Thus, variations in input voltage control the resistivity of the bridge and the impedance presented to the current transformer 12. A resistor 76 is coupled in the series arrangement to provide operation of the lamps 72–75 at the desired level. With this arrangement, voltage multiplication is effected directly by the coupling from the voltage transformer 22 to the current transformer 12.

In the operation of the arrangement of FIG. 3, the incandescent lamps 72–75 are operated, as in the arrangement of FIG. 2, to provide resistances proportional to temperature, and temperature is in turn varied in accordance with the maximum potential derived from the voltage transformer 22. The voltage input heats the lamps 72–75 to a level determined by the longer term voltage variation. The higher the input, the higher the impedance of the coupling circuit. Thus, the impedance presented to the current transformer 12 and hence, the current from the secondary 15 of the current transformer 12, is controlled by the voltage term. The net result is that the amount of current derived as output from the phase detector circuit 30 is determined by the impedance presented to the current transformer 12 by the voltage input. In effect, the multiplication by input voltage is provided at the current transformer 12. Thereafter, the current value representing the product EI is further modified by the term cos θ in the phase detector circuit 30, and a control current representing wattage is applied to the milliammeter 50.

Figure 4:
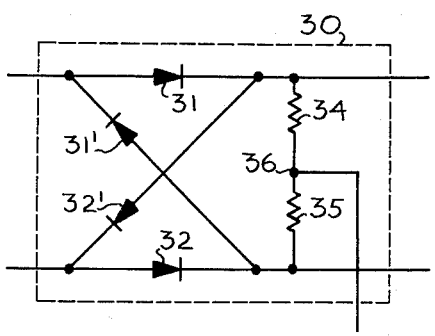
FIG. 4 is a partial view of a circuit which may be employed in the arrangements of the previous figures, if full wave operation is desired.

The phase detector circuits 30 described in FIGS. 1–3 may be further modified to provide full wave operation, if desired. The manner in which this is done is shown schematically in FIG. 4, where additional diodes 31′ and 32′ are cross-coupled across the like-poled diodes 31 and 32 shown in the previous figures. When cross-coupled as shown, and arranged to be of like polarity and opposite to the original diodes 31 and 32, the added diodes 31' and 32' provide full wave detection. The opposite coupling of these diodes permits operation during the previously non-conducting half-cycle and the cross-coupling connection provides conduction of like polarity in both half-cycles. This arrangement may be employed wherever such an indication is desired, or wherever the milliammeter to be used requires such characteristics.

Thus, there has been described an improved meter circuit suitable for providing a load meter, a wattmeter, or various forms of phase sensitive detection. The circuit operates over a wide temperature range, with linear characteristics, and permits the use of a simple indicator movement without the necessity for a complicated control circuit.

What is claimed is:

1. A wattmeter circuit comprising a current transformer having a center-tapped secondary and responsive on its primary to an input current, a voltage transformer responsive on its primary to an input voltage and having one terminal of its secondary coupled to the center tap of the current transformer, a first load circuit coupled across the terminals of the secondary of the current transformer and including a series of resistive elements whose resistivity varies in proportion to the current passing therethrough, means connecting a second terminal of the voltage transformer secondary to a common connection between the resistive elements for varying the resistivity of the resistive elements in accordance with the input voltage at the voltage transformer primary, a phase detector circuit shunting the first load circuit and including at least a pair of like-poled diode symmetrically disposed about a mid-point, the second terminal of the secondary of the voltage transformer being connected to the mid-point, and a second load circuit including a series-connected meter coupled between like terminals of the two diodes and responsive to current passing through the diodes under control of the input voltage.

2. A wattmeter circuit responsive to an input voltage and an input current and providing a current proportional to power including the combination of a current transformer responsive to the input current and having a center-tapped secondary, a voltage transformer responsive to the input voltage and having a secondary coupled at one terminal to the center tap of the current transformer, a variable resistivity circuit comprising at least a pair of voltage variable resistances serially connected to the output of the current transformer secondary, means connecting the remaining terminal of the voltage transformer secondary to a central common connection of the variable resistivity circuit, a phase detector circuit comprising a pair of diodes and a pair of resistors in a symmetrical configuration connected across opposite terminals of the secondary of the current transformer and having a mid-point connected to the remaining terminal of the secondary of the voltage transformer, and a current indicating device connected between the diodes across the resistors of the phase detector circuit.

3. A wattmeter circuit comprising a current transformer having a secondary including a pair of terminals across which outputs are taken and a center tap thereon, a phase detector coupled in shunt to the outputs of the secondary of the current transformer and including like-poled diodes coupling the terminals symmetrically to a mid-point of the phase detector, a resistive circuit which varies in resistivity in proportion to current therein, coupling means connecting opposite ends of the resistive circuit to the output terminals of the current transformer secondary and connecting a mid-point of the resistive circuit to the mid-point of the phase detector for controlling the output of the current transformer secondary in response to variations of input voltage, and a device for detecting the current provided from the phase detector circuit connected to the output of the phase detector between the diodes.

4. A wattmeter circuit for providing a current output which has a value proportional to the power relationship of an applied input current and an applied input voltage, said wattmeter comprising a current transformer having a primary responsive to the input current and a secondary which is center-tapped, a voltage transformer having a primary responsive to the input voltage and a secondary having one terminal coupled to the center tap of the current transformer, a voltage multiplier circuit connected directly across the terminals of the secondary of the current transformer and including a series group of tungsten wire incandescent lamps arranged symmetrically about a mid-point, a resistive circuit coupling the mid-point of the voltage multiplier circuit to the remaining terminal of the secondary of the voltage transformer so that the voltage multiplier circuit is arranged to provide a resistance proportional to the input voltage, a phase detector circuit coupled symmetrically and shunting the voltage multiplier circuit, the phase detector circuit including a pair of like-poled diodes connected to opposite ends of the voltage multiplier circuit and at least a pair of resistors coupled to a mid-point, the mid-point thereof being coupled to the second terminal of the secondary of the voltage transformer, and a current meter coupled across the resistors in the phase detector circuit and providing the desired current output proportional to the power of the input current and the input voltage.

5. A wattmeter circuit for providing an indication proportional to the product of input current, input voltage and the cosine of the phase angle between the two comprising a current transformer having a center-tapped secondary winding; a pair of rectifiers each having a cathode and an anode, each anode being connected to a corresponding output terminal of the secondary winding; a pair of resistors serially connected between the cathodes of the rectifiers; a meter connected in shunt with the pair of resistors; and means for causing the current through the rectifiers to vary in accordance with an applied voltage including a voltage transformer having a secondary winding connected between the center-tap of the current transformer secondary winding and the common connection of the pair of resistors, a plurality of variable resistances exhibiting a positive temperature coefficient serially connected and symmetrically disposed between the anodes of the rectifiers, and connecting means between a mid-point of the variable resistances and the common connection of the pair of resistors.

6. A wattmeter circuit for providing an indication proportional to the product of input current, input voltage and the cosine of the phase angle between the two comprising a current transformer having a center-tapped secondary winding; a pair of rectifiers each having a cathode and an anode, each anode being connected to a corresponding output terminal of the secondary winding; a pair of resistors serially connected between the cathodes of the rectifiers; a meter connected in shunt with the pair of resistors; and means for causing the current through the rectifiers to vary in accordance with an applied voltage including a voltage transformer having a secondary winding connected between the center-tap of the current transformer secondary winding and the common connection of the pair of resistors, a plurality of variable resistances which vary in proportion to the current therethrough, the variable resistances being serially connected and symmetrically disposed between the anodes of the rectifiers, and connecting means between a mid-point of the variable resistances and the common connection of the pair of resistors.

7. A wattmeter circuit for providing an indication proportional to the product of input current, input voltage and the cosine of the phase angle between the two comprising a current transformer having a center-tapped secondary winding; a pair of rectifiers each having a cathode and an anode, each anode being connected to a corresponding output terminal of the secondary winding; a pair of resistors serially connected between the cathodes of the rectifiers; a meter connected in shunt with the pair of resistors; and means for causing the current through the rectifiers to vary in accordance with an applied voltage including a voltage transformer having a secondary winding connected between the center-tap of the current transformer secondary winding and the common connection of the pair of resistors, a plurality of tungsten wire incandescent lamps exhibiting matched characteristics and having individual resistances which vary in proportion to the current therethrough, the lamps being serially connected and symmetrically disposed between the anodes of the rectifiers, and connecting means between a mid-point of the lamps and the common connection of the pair of resistors.

References Cited in the file of this patent

UNITED STATES PATENTS

| | | |
|---|---|---|
| 2,282,396 | Cravath | May 12, 1942 |
| 2,297,255 | Herringen | Sept. 29, 1942 |
| 2,492,556 | Gruchy | Dec. 27, 1949 |
| 2,551,291 | Rich | May 1, 1951 |
| 2,774,038 | Stavis | Dec. 11, 1956 |

FOREIGN PATENTS

| | | |
|---|---|---|
| 1,061,177 | France | Apr. 9, 1954 |
| 1,096,213 | France | June 16, 1955 |
| 631,991 | Great Britain | Nov. 14, 1949 |

UNITED STATES PATENT OFFICE
CERTIFICATE OF CORRECTION

Patent No. 3,068,411                December 11, 1962

Herbert Galman

It is hereby certified that error appears in the above numbered patent requiring correction and that the said Letters Patent should read as corrected below.

Column 7, line 66, after "mid-point" insert -- , a voltage transformer coupling input voltages across the center tap of the secondary and the mid-point --.

Signed and sealed this 27th day of August 1963.

(SEAL)
Attest:

ERNEST W. SWIDER
Attesting Officer

DAVID L. LADD
Commissioner of Patents